March 18, 1930.　　　R. H. DART　　　1,750,663
AUTOMOBILE JACK
Filed Sept. 5, 1928
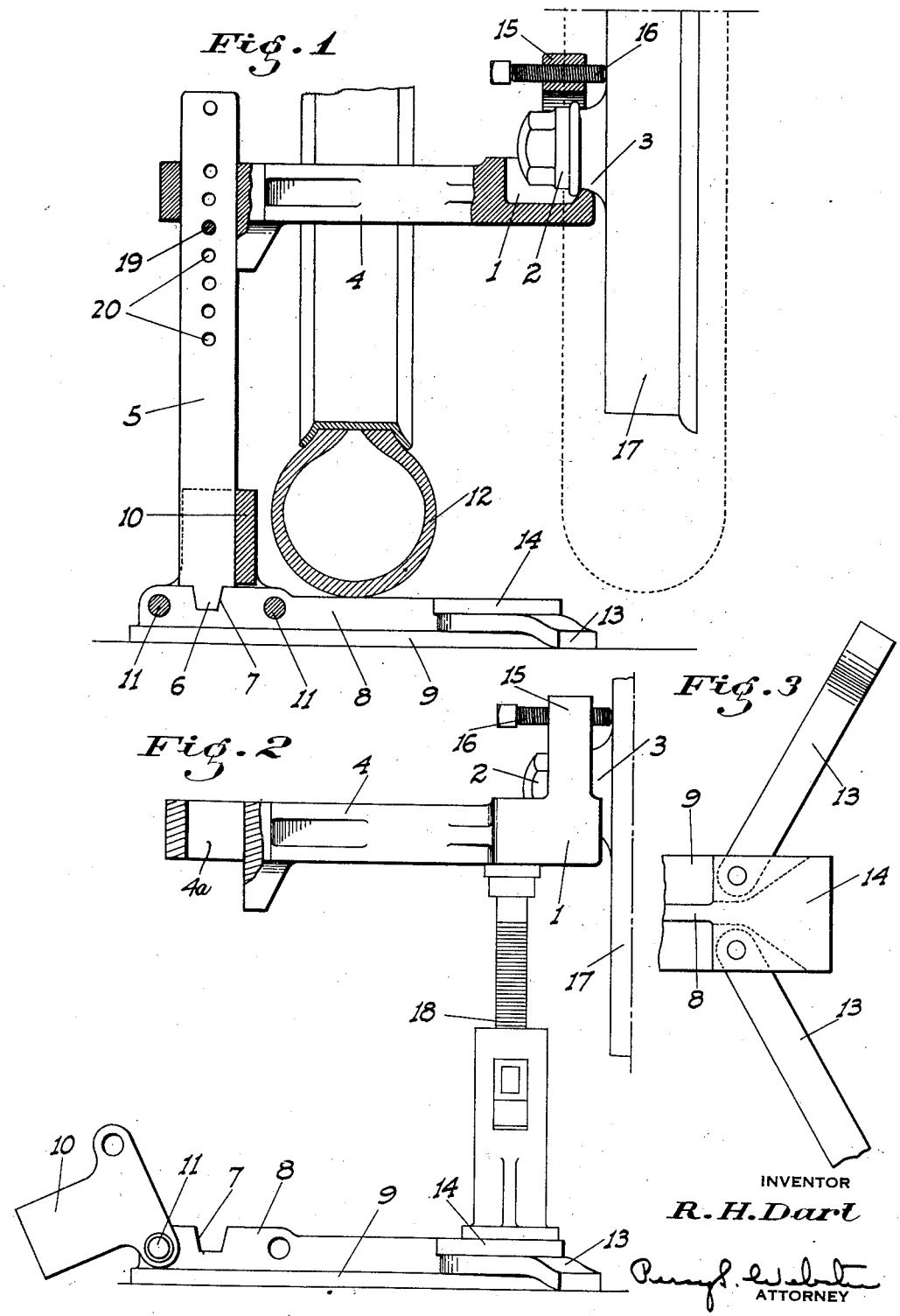
INVENTOR
R. H. Dart
ATTORNEY Patented Mar. 18, 1930

1,750,663

UNITED STATES PATENT OFFICE

ROBERT H. DART, OF SACRAMENTO, CALIFORNIA

AUTOMOBILE JACK

Application filed September 5, 1928. Serial No. 304,085.

This invention relates to devices for jacking up the wheels of motor vehicles for tire changing purposes and particularly represents improvements over my co-pending applications, Serial No. 251,116, filed February 1, 1928, and Serial No. 291,852, filed July 11, 1928.

In the first apparatus, a special jack was formed as an actual part of the appliance. This was not only expensive but it was found that owing to the position of the jack, the movable element of the same bound excessively, and was not commercially practical. The device of the second application avoided this defect by using an ordinary jack where it did not bind, but the construction of the apparatus as a whole was such that considerable machining had to be done and it was hard to accurately locate and aline the separable parts with each other at the outset of operations so that such parts would properly cooperate when necessary.

The principal object of the present invention therefore, is to provide a structure of this character which retains the advantages of the second type above mentioned as far as the jack feature is concerned, but avoiding the difficulties of proper alinement previously had by forming the separable parts so that while easily separated at any time they can be maintained engaged with each other at the outset of operations without interfering with their subsequent disengagement. Also, practically all expensive machining is eliminated.

These objects I accomplish by means of such structure and relative arrangement of parts as will fully appear by a persual of the following specification and claims.

In the drawings similar characters of reference indicate corresponding parts in the several views:

Fig. 1 is a side elevation partly in section of my improved jack structure, shown as applied to a wheel, the latter being raised and the tire removed.

Fig. 2 is a similar view showing the arrangement of parts necessary to enable one tire to be drawn entirely clear of the jack and another one initially placed in position.

Fig. 3 is a fragmentary top plan view of the base of the jack showing the auxiliary supporting feet mounted in connection therewith.

Referring now more particularly to the characters of reference on the drawings, the numeral 1 denotes a cradle adapted to receive the lower portion of a hub cap 2, and having its outer end shaped to engage the hub 3 just back of the cap as shown in Fig. 1. A rigid arm 4 is integral with and projects horizontally from the cradle, this arm being vertically slotted adjacent its outer end as at 4ª to slidably receive a substantially vertical bar 5. This bar has a tongue 6 on its lower end to removably seat in a recess 7 formed in a longitudinal rib 8 upstanding from the base 9 of the structure. Additional support for the bar to resist any tendency of the same bending toward the wheel is had by means of a socket member 10 engaging the lower portion of the bar. This member straddles and is connected to the rib at longitudinally spaced points by removable pins 11, either one of which at a time serves as a pivot for the socket when the other pin is removed. The base when being positioned can only extend to the outer edge of the tire 12 when the latter is on the wheel, and said base has a tendency to tip up when the weight is supported by the bar 5 at the opposite end. To provide additional support for the base to prevent this tipping, horizontally swinging extension feet 13 are pivoted between the base and a flat plate 14 thereabove and disposed at the end of said base adjacent the wheel. These extensions are adapted to be swung to lie at diverging angles away from said end of the base and to then rest on the ground, their length being sufficient so that each will then project somewhat beyond the end of the base as shown in Fig. 3. These extensions also act to prevent lateral tipping of the base without making the same unduly wide. When not in use these feet can be folded up to lie substantially parallel to each other along the opposite sides of the rib 8.

To prevent the cradle from possibly tilting about its point of engagement with the hub as an axis, an arch like stirrup 15 projects upwardly from the cradle and has a horizontal set screw 16 mounted therein for engagement with the face of the wheel 17, immediately above the hub, the length of this screw being sufficient to accommodate the device to different makes of wheels in which the lengths of the hubs differ.

In operation the parts are left loosely assembled while the base is slid into position and the hub cap is passed into the cradle. The feet extensions are then slid out to extend as far forward as possible. An ordinary jack 18 is then placed on the plate 14 (which is a part of the base plate) and is initially engaged with the under face of the cradle to hold the same engaged with the hub. The screw 16 is then adjusted until the arm 4 is in a directly horizontal position or so that the bar 5 can be freely slid up and down without binding. The jack is then manipulated until the tire is at least clear of the top of the plate 14.

The removable pin 19 is then placed through that one of a row of holes 20 in the bar 5 closest to the under face of the bar, and the jack is then lowered and temporarily removed. The weight is then taken by the bar 5 and the arm 4 direct, and there is then nothing adjacent the wheel to prevent removal of the tire. The tire is therefore then removed and withdrawn from the wheel so as to clear the same a sufficient distance to enable the jack to be again placed in position as shown in Fig. 1, the length of the arm 4 being such as to enable this to be done. The jack is then again raised so that the load is taken off the bar 5 and pin 19. Said pin is then withdrawn and the bar 5 is removed by an upward pull.

A free opening is then left between said arm and the socket member 10, which may also be moved out of the way somewhat if necessary by removing one or the other of the pins 11 and tilting said member back or forward as shown in Fig. 2.

The opening thus provided is of ample size to enable the tire to be withdrawn, and another one is then placed in position in front of the jack. The bar 5 is then replaced, the arm 4 is then supported by the pin 19, the jack is removed, and the tire placed and secured on the wheel. The jack is then again placed so as to lower the cradle free of the wheel, the pin 19 being of course withdrawn to allow said arm to slide freely down the bar.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A wheel supporting structure comprising a base adapted to rest on the ground and project outwardly from a wheel in substantially parallel relation to the axis thereof, a vertical bar removably mounted on the base toward the outer end thereof, a horizontal arm in one end of which the bar is removably slidable said arm overhanging the base, a cradle rigid on the other end of the arm to detachably engage the hub of the wheel, and means on the bar for supportng the arm at different heights thereon.

2. A structure as in claim 1, the arm and cradle member extending to a point directly above the inner edge of the base to enable a raising jack to be placed between said arm and base.

3. A structure as in claim 1, with feet extensions swivelly mounted on the base adjacent the end thereof nearest the wheel to adjustably extend at a diverging angle to the base beyond the adjacent end of the same.

4. A wheel supporting structure comprising a base adapted to rest on the ground and project outwardly from a wheel in substantially parallel relation to the axis thereof, a vertical bar projecting upwardly from the base adjacent the outer end thereof, a socket means mounted in connection with the base to removably support the bar against tilting movement toward the opposite end of the base, a horizontal arm in one end of which the bar is removably slidable, a cradle rigid on the opposite end of the arm to detachably support the hub of a wheel, and a pin removably projecting through any one of a vertical row of holes in the bar.

5. A structure as in claim 1, with a member rigid with and projecting upwardly from the cradle and a screw threaded through said member and extending lengthwise of the arm for engagement with the face of the wheel above and adjacent the hub.

6. A wheel supporting structure including a horizontal arm, a cradle on one end of the arm to engage the hub of a wheel, means applied to the other end of the arm for rigidly supporting the same, a member rigid with and projecting upwardly from the cradle, and a screw extending lengthwise of the arm adjustably threaded through said member in a position to engage the wheel above the hub.

7. A wheel supporting structure including a horizontal arm, a cradle on one end of the arm to engage the hub of a wheel, means applied to the other end of the arm for rigidly supporting the same, a base extending lengthwise of the arm toward the wheel and on which said arm supporting means is mounted, and feet extensions mounted on the end of the base nearest the wheel and adapted to extend at diverging angles to the base beyond said end of the same.

In testimony whereof I affix my signature.
ROBERT H. DART.